(12) United States Patent
Suzuki

(10) Patent No.: US 9,764,475 B2
(45) Date of Patent: Sep. 19, 2017

(54) WORKPIECE TAKING OUT ROBOT SYSTEM HAVING CONVERSION-CALCULATION FUNCTION OF POSITION AND ORIENTATION, AND WORKPIECE TAKING OUT METHOD

(71) Applicant: FANUC Corporation, Yamanashi (JP)

(72) Inventor: Tadanori Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 46 days.

(21) Appl. No.: 15/014,689

(22) Filed: Feb. 3, 2016

(65) Prior Publication Data

US 2016/0229062 A1    Aug. 11, 2016

(30) Foreign Application Priority Data

Feb. 10, 2015   (JP) ................. 2015-024370

(51) Int. Cl.
    *G05B 15/00*    (2006.01)
    *G05B 19/00*    (2006.01)
    *B25J 9/16*    (2006.01)

(52) U.S. Cl.
CPC .......... *B25J 9/1697* (2013.01); *B25J 9/1666* (2013.01); *G05B 2219/40053* (2013.01)

(58) Field of Classification Search
CPC ................. B25J 9/1697; B25J 9/1666; G05B 2219/40053
USPC ................................... 700/245, 259
See application file for complete search history.

(56) References Cited

U.S. PATENT DOCUMENTS

| | | | | |
|---|---|---|---|---|
| 7,123,992 B2 * | 10/2006 | Ban | ........................... | B07C 5/10 700/245 |
| 7,313,464 B1 * | 12/2007 | Perreault | ................ | B25J 9/1666 318/568.1 |
| 7,996,114 B2 * | 8/2011 | Ban | ......................... | B25J 9/1697 382/153 |
| 8,948,904 B2 * | 2/2015 | Murayama | ............. | B25J 9/1612 318/568.21 |
| 9,026,234 B2 * | 5/2015 | Suzuki | ................... | B25J 9/1669 700/1 |

(Continued)

FOREIGN PATENT DOCUMENTS

| | | |
|---|---|---|
| JP | 4-93191 A | 3/1992 |
| JP | H05-104465 A | 4/1993 |

(Continued)

*Primary Examiner* — Jaime Figueroa
(74) *Attorney, Agent, or Firm* — Hauptman Ham, LLP

(57) ABSTRACT

A robot system and a method, by which a robot can effectively and sequentially take out a plurality of randomly located workpieces, while avoiding interference by a simple calculation. A first detection coordinate system for determining the motion of the robot is defined on the lateral surface of the workpiece. The first detection coordinate system is translated by a predetermined distance in the negative direction of a Z-axis, and then an X-Z plane is rotated about an X-axis of the workpiece so that the X-Z plane is perpendicular to an X-Y plane of a robot coordinate system, whereby a work coordinate system is obtained. Next, the work coordinate system is rotated about the X-axis by a target angle, and then is translated by a distance corresponding to a radius of the workpiece in the positive direction of the Z-axis, whereby a second detection coordinate system is obtained and output.

4 Claims, 7 Drawing Sheets

(56) References Cited

U.S. PATENT DOCUMENTS

| | | | | |
|---|---|---|---|---|
| 9,050,722 | B2* | 6/2015 | Satou | B25J 9/1679 |
| 9,079,310 | B2* | 7/2015 | Kumiya | B25J 9/1697 |
| 9,089,966 | B2* | 7/2015 | Domae | B25J 9/1612 |
| 9,089,971 | B2* | 7/2015 | Aoba | B25J 9/1697 |
| 9,132,548 | B2* | 9/2015 | Kamiya | B25J 9/1669 |
| 9,258,550 | B1* | 2/2016 | Sieracki | H04N 13/0282 |
| 2004/0117066 | A1* | 6/2004 | Ban | B07C 5/10 700/245 |
| 2007/0274812 | A1* | 11/2007 | Ban | B25J 9/1697 414/217 |
| 2012/0065780 | A1* | 3/2012 | Yamaguchi | B25J 15/0206 700/259 |
| 2012/0215350 | A1* | 8/2012 | Murayama | B25J 9/1612 700/248 |
| 2012/0259462 | A1* | 10/2012 | Aoba | B25J 9/1697 700/245 |
| 2012/0296469 | A1* | 11/2012 | Yoshinaga | B25J 15/0616 700/218 |
| 2013/0030569 | A1* | 1/2013 | Fudaba | G05B 19/423 700/245 |
| 2013/0211593 | A1* | 8/2013 | Domae | B25J 9/1612 700/258 |
| 2013/0238128 | A1* | 9/2013 | Suzuki | B25J 9/1669 700/258 |
| 2014/0018959 | A1* | 1/2014 | Matsui | B25J 9/1666 700/255 |
| 2014/0031985 | A1* | 1/2014 | Kumiya | B25J 9/1697 700/259 |
| 2014/0074288 | A1* | 3/2014 | Satou | B25J 9/1679 700/253 |
| 2014/0277719 | A1* | 9/2014 | Kamiya | B25J 9/1669 700/253 |

FOREIGN PATENT DOCUMENTS

| | | |
|---|---|---|
| JP | 2003-117963 A | 4/2003 |
| JP | 2005-305613 A | 11/2005 |
| JP | 2007-203406 A | 8/2007 |
| JP | 2008-272886 A | 11/2008 |
| JP | 2010-137299 A | 6/2010 |
| JP | 2011-93014 A | 5/2011 |
| JP | 2011-251289 A | 12/2011 |
| JP | 2014-54715 A | 3/2014 |
| JP | 2015-9314 A | 1/2015 |

* cited by examiner

ENLARGED VIEW OF SECTION A

ENLARGED VIEW OF SECTION B

ENLARGED VIEW OF SECTION C

WORKPIECE TAKING OUT ROBOT SYSTEM HAVING CONVERSION-CALCULATION FUNCTION OF POSITION AND ORIENTATION, AND WORKPIECE TAKING OUT METHOD

RELATED APPLICATIONS

The present application claims priority to Japanese Application Number 2015-024370, filed Feb. 10, 2015, the disclosure of which is hereby incorporated by reference herein in its entirety.

BACKGROUND OF THE INVENTION

1. Field of the Invention

The present invention relates to a workpiece taking out robot system having a conversion-calculation function with regard to the position and orientation of a workpiece to be taken out by a robot, and a workpiece taking out method while executing the conversion-calculation.

2. Description of the Related Art

Generally, in a robot system for taking out a plurality of randomly located workpieces one-by-one by using a robot, the position and orientation (hereinafter, also referred to as "position/orientation") of the workpiece are detected by a sensor, and a hand of the robot is moved to the detected position and orientation so as to hold and take out the workpiece. As a relevant prior art document, JP 2007-203406 A discloses a workpiece taking out device including: a robot configured to grip and take out a plurality of the same kind of workpieces located in a container; a robot controller for controlling the robot; a video camera positioned just above the container and configured to capture the workpieces in a wide range; and an image processor for processing an image obtained by the video camera.

JP 2008-272886 A discloses a device and a method, in which a candidate position of a workpiece gripped by a robot hand is automatically selected based on information of the shape of the workpiece, and a grip path is generated along which the robot hand approaches the workpiece based on the selected candidate position, in order to reduce time required for a teaching operation.

Further, JP H05-104465 A discloses an operation scheduling device for a robot, wherein: position/orientation candidates are calculated where an object can be gripped and located, based on initial and target states of the object and a geometrical feature of a robot hand; an opened pyramid is selected which does not interfere with an obstacle, among pyramids each having a center corresponding to a grip position of the calculated candidate; a distance between the selected opened pyramid and a closed pyramid is calculated; and the position/orientation candidate having the widest operation area for a grip operation is selected among the candidates, based on the calculation result.

In many cases, the sensor for detecting the position/orientation of each of the randomly located workpieces is positioned above the workpieces so that all of the workpieces can be detected. Therefore, a plurality of detection results can be obtained with respect to the located workpieces, and then a priority order of the workpieces to be taken out can be determined so that the robot can take out the workpieces according to the priority order. However, since such a process is carried out based on the result (an image) obtained by capturing the workpieces from above, when the uppermost workpiece cannot be taken out due to interference between the robot hand and the container, etc., another workpiece positioned immediately below the uppermost workpiece may also not be taken out due to the existence of the uppermost workpiece. As a result, the plurality of workpieces may remain in the container without being taken out (see FIGS. 4a to 6b as described below).

In order to resolve the above problem in the configurations of the above patent documents, a method for calculating the grip position based on a previously registered geometrical feature of a workpiece, or a method for matching a detected workpiece with a previously registered three-dimensional model of the workpiece can be used, whereby a portion of the workpiece can be specified so that the robot can grip the portion without interfering with an obstacle, etc. However, in such a method, it is necessary to previously register or store the three-dimensional model of the workpiece, which is labor intensive in particular when there are many kinds of workpieces.

SUMMARY OF THE INVENTION

An object of the present invention is to provide a workpiece taking-out robot system and a workpiece taking-out method, by which a robot for sequentially taking out a plurality of randomly located workpieces can effectively take out the workpieces, while avoiding interference by a simple calculation.

According to one aspect the present invention, a workpiece taking out robot system for taking out a plurality of randomly located workpieces, the workpiece taking out robot system comprising: a vision sensor which obtains information on a height distribution of the plurality of workpieces; a robot having a hand configured to hold the workpiece; an arithmetic unit having a function for calculating a first position/orientation of the workpiece based on the information on the height distribution obtained by the vision sensor, and determining a motion of the robot for taking out the workpiece by the hand, based on the first position/orientation; and a robot controller which controls the robot so that the hand is moved based on the motion of the robot determined by the arithmetic unit so as to take out a workpiece to be taken out by the hand, wherein the arithmetic unit has a function for converting the first position/orientation to a second position/orientation based on orientation conversion information determined based on a shape of the workpiece, and wherein the arithmetic unit determines the motion of the robot for taking out the workpiece by the hand based on the second position/orientation, when the first position/orientation is converted to the second position/orientation, is provided.

The orientation conversion information may include a radius of the workpiece and a rotation angle about a center axis of the workpiece.

The orientation conversion information may be designated or input by using a numerical value.

In a preferred embodiment, the arithmetic unit coverts the first position/orientation to the second position/orientation, when the robot interferes with an article other than the workpiece to be taken out if the hand is moved based on the motion of the robot based on the first position/orientation.

According to another aspect the present invention, a workpiece taking out method for taking out a plurality of randomly located workpieces by using a robot having a hand, the workpiece taking out robot method comprising the steps of: obtaining information on a height distribution of the plurality of workpieces; calculating a first position/orientation of the workpiece based on the information on the height distribution; converting the first position/orientation to a second position/orientation based on orientation conversion information determined based on a shape of the workpiece; determining a motion of the robot for taking out the workpiece by the hand, based on the second position/orientation; and controlling the robot so that the hand is moved based on the determined motion of the robot so as to take out a workpiece to be taken out by the hand, is provided.

In the method, the orientation conversion information may include a radius of the workpiece and a rotation angle about a center axis of the workpiece.

The method may include the step of designating or inputting the orientation conversion information by using a numerical value.

In a preferred embodiment, the method may include the step of judging as to whether or not the robot interferes with an article other than the workpiece to be taken out, when the hand is moved based on the motion of the robot based on the first position/orientation.

BRIEF DESCRIPTION OF THE DRAWINGS

The above and other objects, features and advantages of the present invention will be made more apparent by the following description of the preferred embodiments thereof with reference to the accompanying drawings wherein:

FIG. 4b is a partial enlarged view of a section "A" in FIG. 4a;

FIG. 5b is a partial enlarged view of a section "B" in FIG. 5a;

FIG. 6b is a partial enlarged view of a section "C" in FIG. 6a;

DETAILED DESCRIPTION

Figure 1:
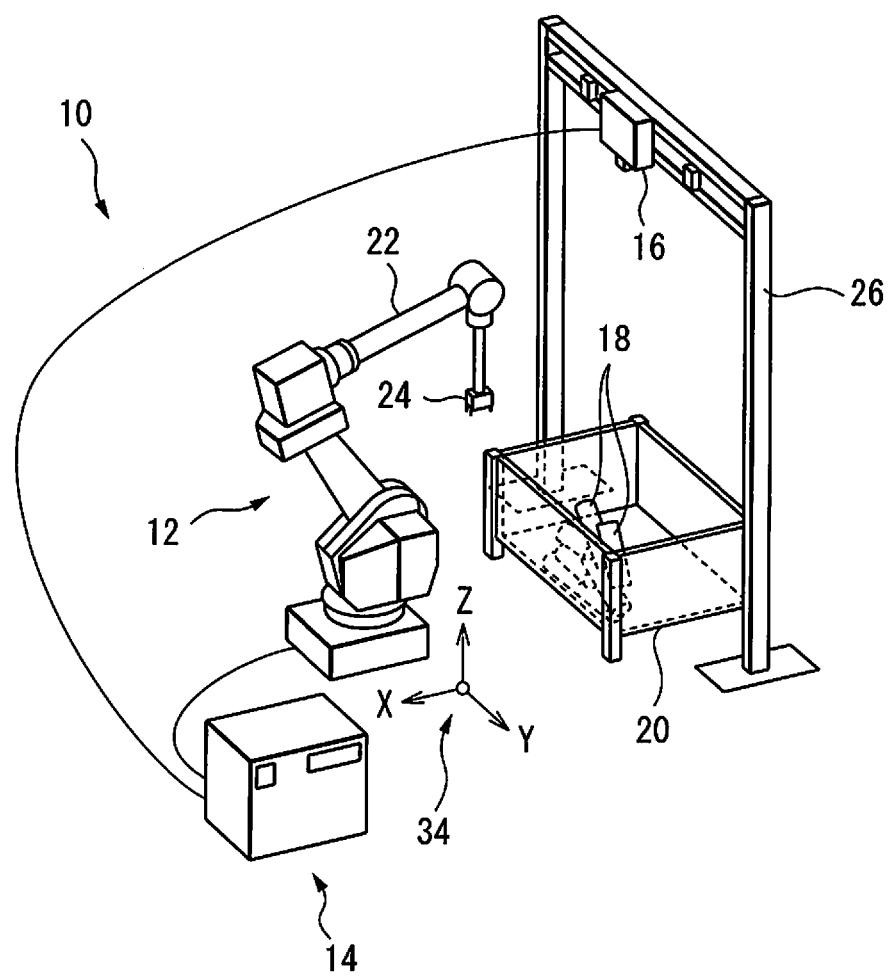
FIG. 1 is a view of a schematic configuration of a workpiece taking out robot system according to an embodiment of the present invention.

FIG. 1 is a view showing a schematic configuration of a workpiece taking out robot system 10 according to a preferred embodiment of the present invention. Robot system 10 includes a robot 12, a robot controller 14 for controlling robot 12, and a vision sensor (camera) 16 connected to robot controller 14. Robot system 10 is used to hold and take out a plurality of (in the drawing, the same kind of) workpieces 18 one-by-one from a container (box) 20 in which workpieces 18 are randomly located (or piled).

Robot 12 has a movable part such as a robot arm 22, and a workpiece holding part such as a robot hand 24 attached to a front end of robot arm 22. Robot hand 24 is configured to hold workpiece 18 (in the drawing, a lateral side of workpiece 18 having a generally columnar shape) within container 20. In this regard, the term "hold" used herein may include any motion for holding at least one (normally, one) workpiece, such as "nip," "grip," or "adsorb" by using a magnetic force or decompression, etc.

Camera 16 can capture a two-dimensional image of workpieces 18 located in container 20. The obtained two-dimensional image is transmitted to and processed by robot controller 14 having an image processing function or another image processor, whereby the position and orientation of each workpiece are detected. In the drawing, camera 16 is positioned at a fixed portion such as a dedicated pedestal 26 so that the entire of container 20 is positioned within a field of view of camera 16. Alternatively, camera 16 may be attached to a movable part such as robot arm 22 or robot hand 24.

Figure 2:
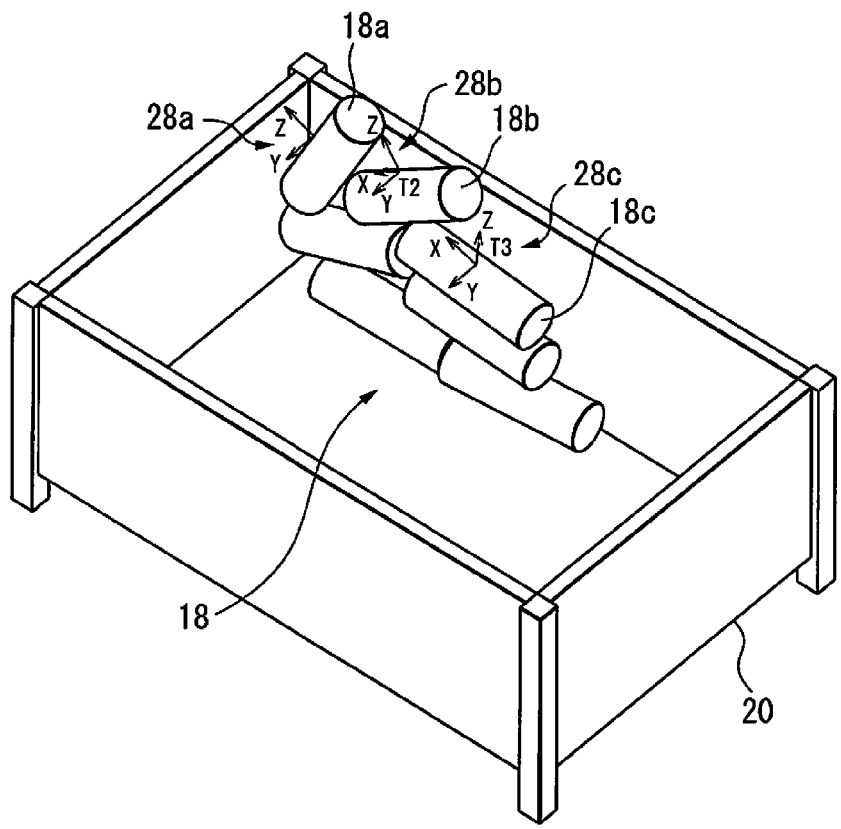
FIG. 2 is a view of an example of a state in which a plurality of workpieces are randomly located in a container.
Figure 3:
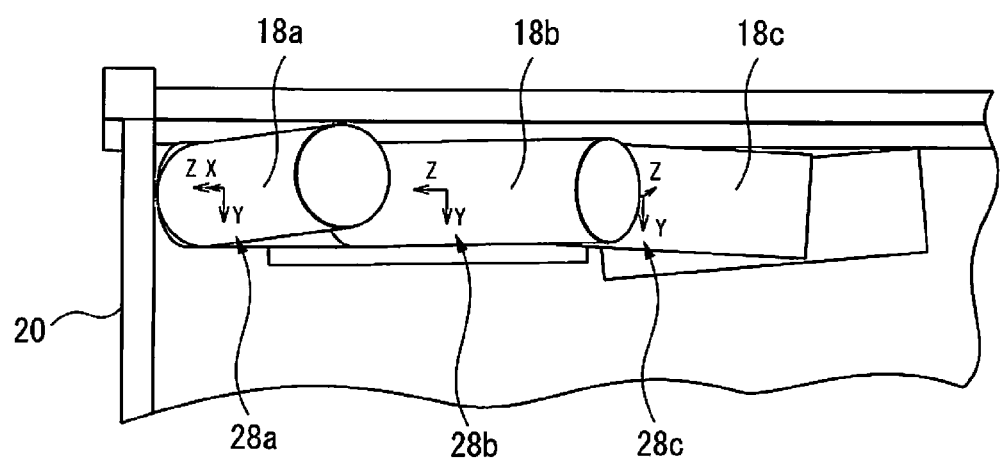
FIG. 3 is a view of an example of an image obtained by capturing the workpieces by a camera positioned above the container.

FIG. 2 shows an example of a state in which a plurality of workpieces 18 are randomly located in container 20. Concretely, among workpieces 18, workpiece 18a is the uppermost workpiece, workpiece 18b is a second-most upper workpiece (or is positioned partially below workpiece 18a), and workpiece 18c is a third-most upper workpiece (or is positioned partially below workpiece 18b). In other words, as shown in FIG. 3, when the inside of container 20 is captured by camera 16 positioned above container 20, in the obtained image, workpiece 18a and 18b are partially overlapped with each other (workpiece 18a is above workpiece 18b), and workpiece 18b and 18c are partially overlapped with each other (workpiece 18b is above workpiece 18c).

In the state of FIG. 2, a detected position of each workpiece is calculated based on information on a height distribution of a surface of each workpiece obtained by camera 16. In the drawing, based on a result of image processing with respect to the image obtained by camera 16, detection coordinate systems 28a, 28b and 28c are defined on cylindrical lateral sides of workpiece 18a, 18b and 18c, respectively. Robot controller 14 can calculate or determine the motion of the robot for taking out the workpiece, based on these detection coordinate systems (or the position/orientation of each workpiece). In this regard, an X-direction of each coordinate system is parallel to an axial direction of the corresponding workpiece, a Z-direction coincides with a radial direction of the corresponding workpiece, and a Y-direction is perpendicular to both the X- and Z-directions.

Figure 4A:
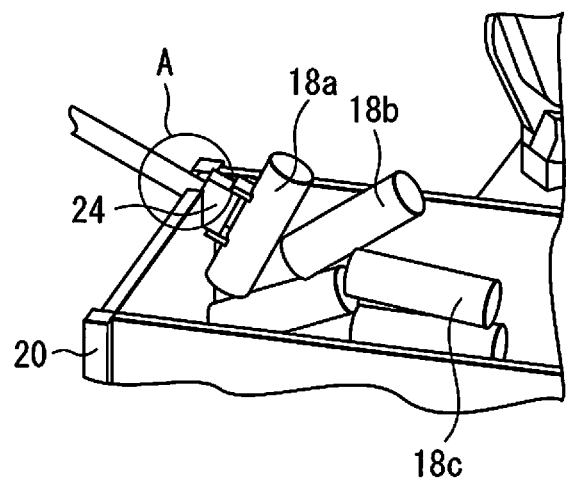
FIG. 4a shows a case in which an uppermost workpiece is taken out by a robot in a conventional method.
Figure 4B:
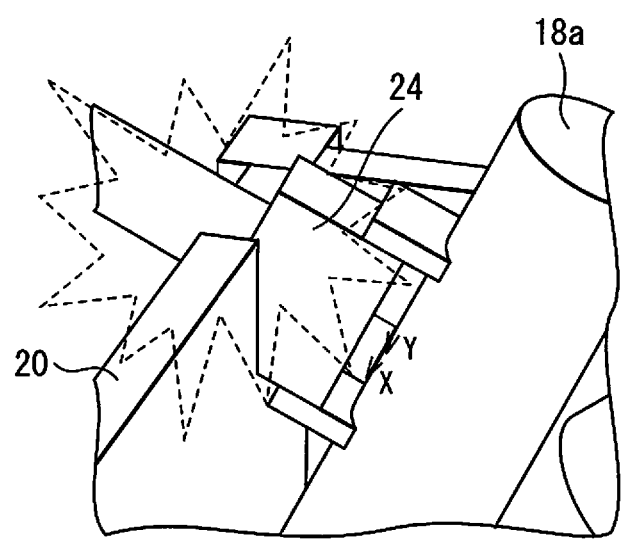

FIGS. 4a to 6b show a comparative example in which workpieces 18a, 18b and 18c are taken out by the robot according to the conventional method. Since workpiece 18a is the uppermost workpiece among the three workpieces as explained above, robot controller 14 firstly determines the motion of robot 12 for taking out uppermost workpiece 18a. However, as shown in FIG. 4a and FIG. 4b (or a partial enlarged view of FIG. 4a), workpiece 18a may not be taken out since hand 24 interferes with container 20.

Figure 5A:
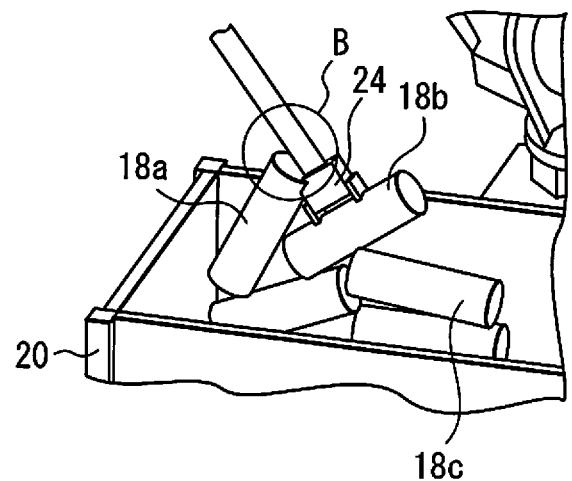
FIG. 5a shows a case in which a second-most upper workpiece is taken out by a robot in the conventional method.
Figure 5B:
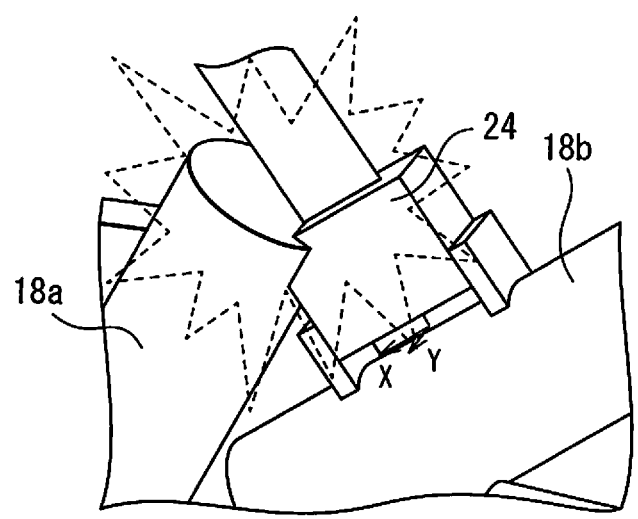
Figure 6A:
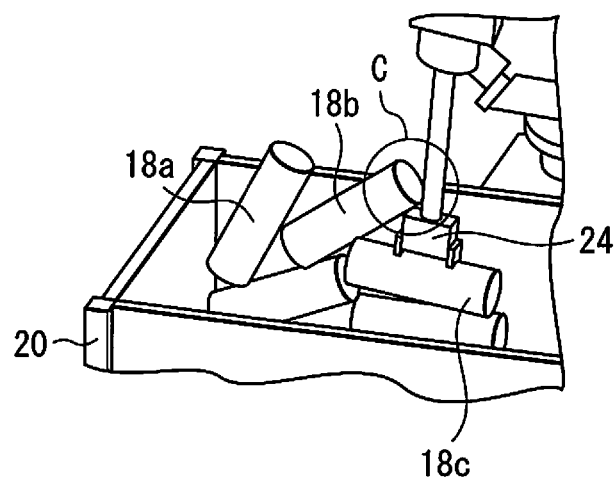
FIG. 6a shows a case in which a third-most upper workpiece is taken out by a robot in the conventional method.
Figure 6B:
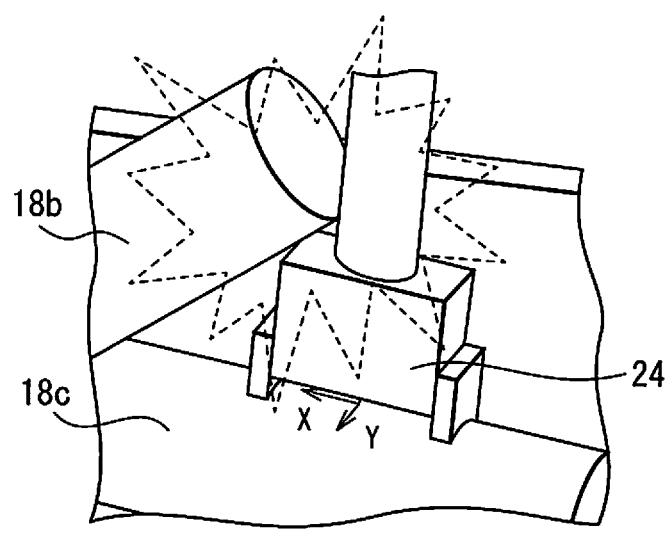

Then, robot controller 14 determines the motion of robot 12 for taking out second-most upper workpiece 18b. However, as shown in FIG. 5a and FIG. 5b (or a partial enlarged view of FIG. 5a), workpiece 18b may not be taken out since hand 24 interferes with uppermost workpiece 18a. After that, robot controller 14 determines the motion of robot 12 for taking out third-most upper workpiece 18c. However, as shown in FIG. 6a and FIG. 6b (or a partial enlarged view of FIG. 6a), workpiece 18c may not be taken out since hand 24 interferes with second-most upper workpiece 18b.

According to the conventional method, the detection coordinate system is defined on the upper part (or the upper portion of the lateral side) of each workpiece since each workpiece is captured from above. Therefore, when the workpieces are to be taken out based on such detection coordinate systems, the motion of the robot may not be determined with respect to any workpiece (i.e., the workpieces cannot be taken out), due to the interference between hand 24 and container 20 or the workpiece positioned above the target workpiece.

On the other hand, robot system 10 according to the present invention has an arithmetic unit for converting a first detection coordinate system (or a first position/orientation), defined on the surface of workpiece 18 by processing of the image obtained by camera 16, to a second detection coordinate system (or a second position/orientation) in which the robot does not interfere with an article other than the target workpiece to be taken out, based on orientation conversion information (described below) determined based on the shape of workpiece 18. In this embodiment, robot controller 14 includes the arithmetic unit or the function thereof. Hereinafter, a concrete example of the function of the arithmetic unit is explained.

Figure 7:
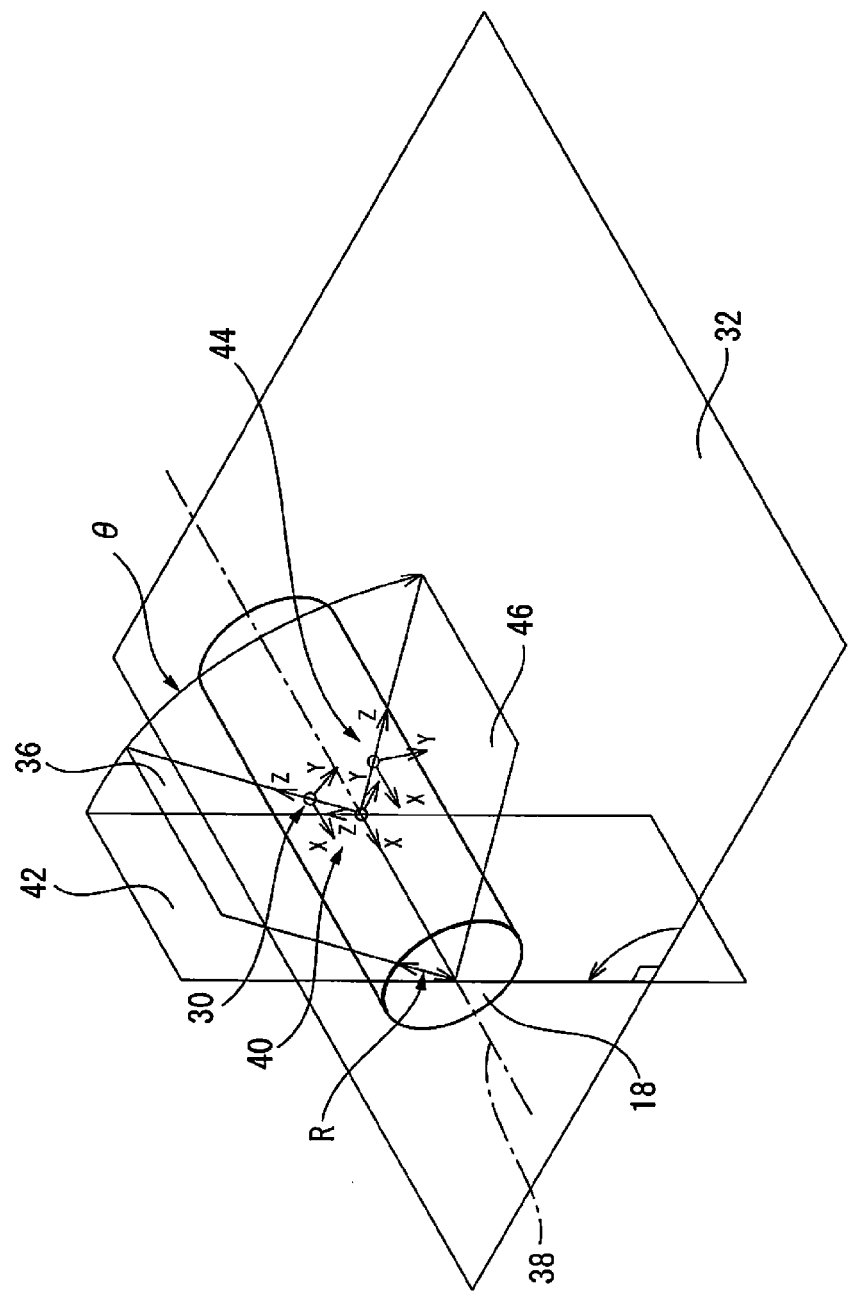
FIG. 7 is a view explaining converting calculation when the workpiece has a columnar shape.

FIG. 7 explains an example of the above conversion calculation when workpiece 18 has a columnar shape. First, based on the information on the height distribution of workpiece 18 obtained by camera 16, first detection coordinate system 30 for determining the taking out motion of the robot is defined on the (lateral) surface of workpiece 18. The origin of first detection coordinate system 30 is positioned on the lateral side of workpiece 18. An X-axis of first coordinate system 30 is parallel to the axial direction of workpiece 18, and Y- and Z-axes extend in a tangential direction and a radial (normal) direction of workpiece 18, respectively. In addition, a plane 32 in FIG. 7 represents an X-Y plane of a robot coordinate system 34 (see FIG. 1) used to determine or correct the motion of robot 12.

As shown in FIG. 7, an X-Z plane 36 of first coordinate system 30 is not always perpendicular to X-Y plane 32 of the robot coordinate system. Therefore, first detection coordinate system 30 is translated by a predetermined distance (in this case, a distance R corresponding to the radius of workpiece 18) in the negative direction of the Z-axis thereof, and then X-Z plane 36 (first detection coordinate system 30) is rotated about X-axis 38 of workpiece 18 so that X-Z plane 36 is perpendicular to X-Y plane 32 of the robot coordinate system, whereby a work coordinate system 40 is obtained. As a result, X-Z plane 36 is rotationally moved to an X-Z plane 42.

Next, work coordinate system 40 (X-Z plane 42) is rotated about the X-axis thereof by a target angle θ, and then work coordinate system 40 is translated by the distance corresponding to radius R of workpiece 18 in the positive direction of the Z-axis, whereby a second detection coordinate system 44 is obtained and output. As a result, X-Z plane 42 is rotationally moved to an X-Z plane 46. In other words, second detection coordinate system 44 is obtained by rotating first coordinate system 30 about the X-axis of work coordinate system 40. In this regard, target angle θ in FIG. 7 is an angle formed by X-Z plane 36 of first detection coordinate system 30 and X-Y plane 32 of the robot coordinate system.

Figure 8:
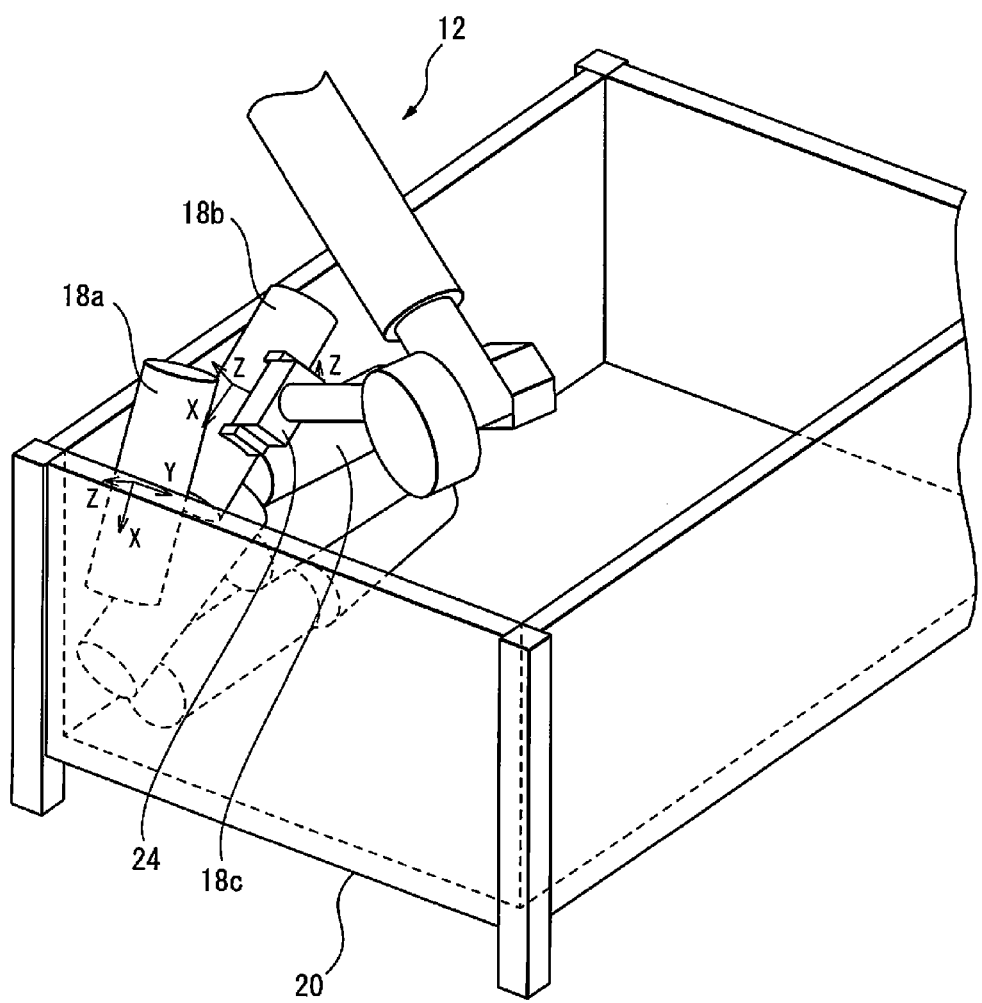
FIG. 8 is a view explaining an example in which a target workpiece is taken out by the robot based on a result of the converting calculation.

FIG. 8 shows an example in which the taking out motion of robot 12 is determined based on second detection coordinate system 44 obtained by the conversion calculation explained by using FIG. 7, and robot 12 is controlled with respect to workpiece 18b in FIG. 2, based on the determined taking out motion. As shown in FIG. 2 or 3, in the prior art, the first detection coordinate system is defined on the upper part of workpiece 18b, and thus hand 24 may interfere with workpiece 18a when robot 12 is operated based on the first coordinate system. On the other hand, in the present invention, the first detection coordinate system is converted to the second coordinate system on the lateral side of workpiece 18b, and thus workpiece 18b can be taken out without occurring interference, when robot 12 is operated based on the converted (second) detection coordinate system.

In the present invention, by merely designating or inputting the radius of the workpiece and the target angle, the detection coordinate system defined on the workpiece can be easily moved (or converted) to a position where the robot can take out the workpiece without interfering with an obstacle, etc. In the example of FIG. 8, when the uppermost workpiece 18a cannot be taken out due to the interference, the conversion calculation is carried out with respect to the second-most upper workpiece 18b. However, before the conversion calculation with respect to the second-most upper workpiece, the conversion calculation may be carried out with respect to the uppermost workpiece. In this regard, it is preferable that the second-most upper workpiece 18b be taken out when the uppermost workpiece 18a cannot be taken out by the conventional method, since the position/orientation of the uppermost workpiece is changed (or the uppermost workpiece is moved) after the second-most upper workpiece is taken out.

The target angle as explained above may be designated or input by an operator by using a numerical value via a proper input device arranged on controller 14, etc. Alternatively, the operator may designate or input the target angle by a visual operation by using a proper display arranged on controller 14, etc. Otherwise, an appropriate increment of the target angle (for example, 5 to 10 degrees) may be previously determined, and a process, in which the detection coordinate system is rotated by the increment angle when the interference occurs, may be automatically repeated until the interference does not occur. In this case, the conversion calculation can be automatically carried out even when the target angle is previously designated or input.

The conversion calculation may be carried out when it is judged that the robot interferes with the container or the workpiece other than the target workpiece to be taken out. Otherwise, the conversion calculation may be carried out based on the orientation conversion information (such as the radius of the workpiece and the target angle), without judging the occurrence of the interference. In this case, it is preferable that the target angle be previously determined by the operator.

In the above embodiment, the workpiece has the columnar shape, and the orientation conversion information includes the radius of the workpiece and the target angle (or the rotation angle about the center axis of the workpiece). However, the present invention is not limited to as such. For example, when a part of the workpiece has a generally columnar shape (for example, a bolt), the conversion calculation can be carried out by a method similar to the method as shown in FIG. 8. Otherwise, when the workpiece has a prismatic columnar shape, the method similar to FIG. 8 can be carried out, by using an equivalent radius (or a half of an equivalent diameter) or a minimum distance between the workpiece surface and the center axis of the workpiece, as the radius of the workpiece.

Further, when the robot hand has a workpiece holding portion with a spherical surface configured to adsorb the workpiece in a point-contact manner, or when the robot hand has a sucker with a floating structure, the present invention can be used by approximating the workpiece by a columnar shape, even if the workpiece does not have a columnar shape. In the present invention, the term "radius" of the workpiece may include a radius of a workpiece having an approximated columnar shape, as well as a radius of a workpiece (or a part of the workpiece) having acolumnar shape.

According to the present invention, the first position/orientation calculated based on the height distribution obtained by the vision sensor can be easily converted to the second position/orientation based on the orientation conversion information. Therefore, the motion of the robot for taking out the workpiece without occurring interference can be calculated or determined without making an elaborate calculation.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A workpiece taking out robot system for taking out a plurality of randomly located workpieces each having a columnar shape, the workpiece taking out robot system comprising:
   a vision sensor which obtains information on a height distribution of the plurality of workpieces;
   a robot having a hand configured to hold the workpiece;
   an arithmetic unit having a function for calculating a first detection coordinate system defined on a surface of the workpiece based on the information on the height distribution obtained by the vision sensor, and determining a motion of the robot for taking out the workpiece by the hand, based on the first detection coordinate system; and
   a robot controller which controls the robot so that the hand is moved based on the motion of the robot determined by the arithmetic unit so as to take out a workpiece to be taken out by the hand,
   wherein the arithmetic unit has a function for converting the first detection coordinate system to a second detection coordinate system by rotating the first detection coordinate system about a center axis of the workpiece, and
   wherein the arithmetic unit determines the motion of the robot for taking out the workpiece by the hand based on the second detection coordinate system, when the first detection coordinate system is converted to the second detection coordinate system, and
   wherein a radius of the workpiece and a rotation angle of the workpiece about the center axis of the workpiece can be designated or input by using a numerical value.

2. The workpiece taking out robot system as set forth in claim 1, wherein the arithmetic unit coverts the first detection coordinate system to the second detection coordinate system, when the robot interferes with an article other than the workpiece to be taken out if the hand is moved based on the motion of the robot based on the first detection coordinate system.

3. A workpiece taking out method for taking out a plurality of randomly located workpieces each having a columnar shape by using a robot having a hand, the workpiece taking out robot method comprising the steps of:
   obtaining information on a height distribution of the plurality of workpieces;
   calculating a first detection coordinate system defined on a surface of the workpiece based on the information on the height distribution;
   converting the first detection coordinate system to a second detection coordinate system by rotating the first detection coordinate system about a center axis of the workpiece;
   determining a motion of the robot for taking out the workpiece by the hand, based on the second detection coordinate system;
   controlling the robot so that the hand is moved based on the determined motion of the robot so as to take out a workpiece to be taken out by the hand, and
   designating or inputting a radius of the workpiece and a rotation angle of the workpiece about the center axis of the workpiece by using a numerical value.

4. The workpiece taking out method as set forth in claim 3, further comprising the step of judging as to whether or not the robot interferes with an article other than the workpiece to be taken out, when the hand is moved based on the motion of the robot based on the first detection coordinate system.

* * * * *